May 12, 1925.

J. BROWN

WEAR AND STRAIN RESISTING FABRIC

Filed Sept. 10, 1920

Inventor
John Brown,
By Lawrence Langner
Attorney

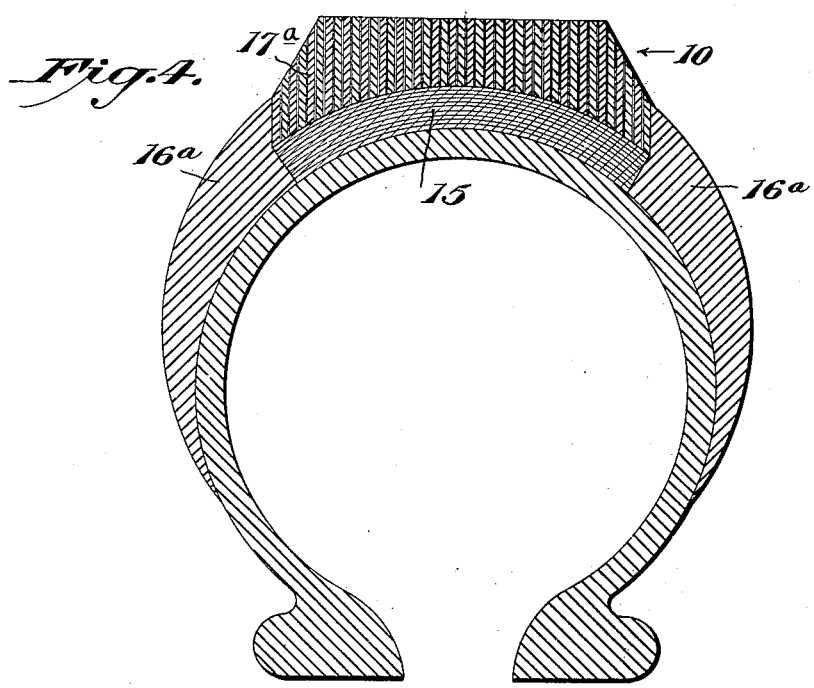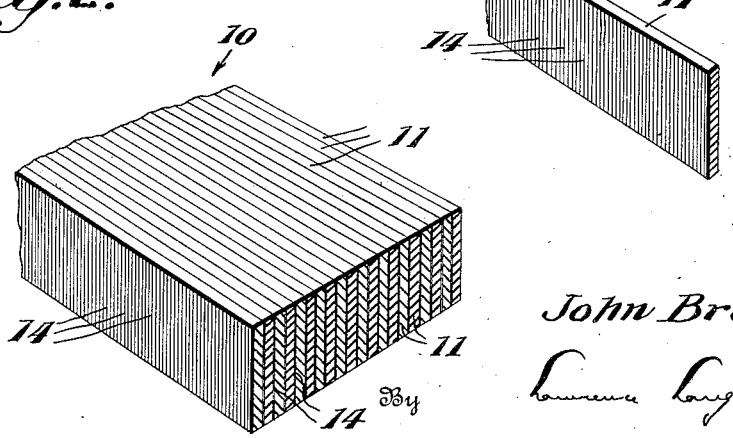

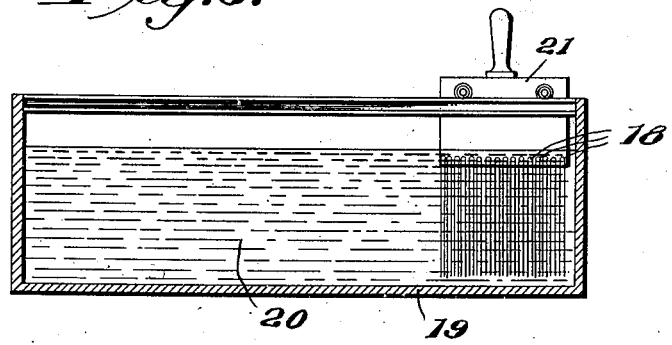
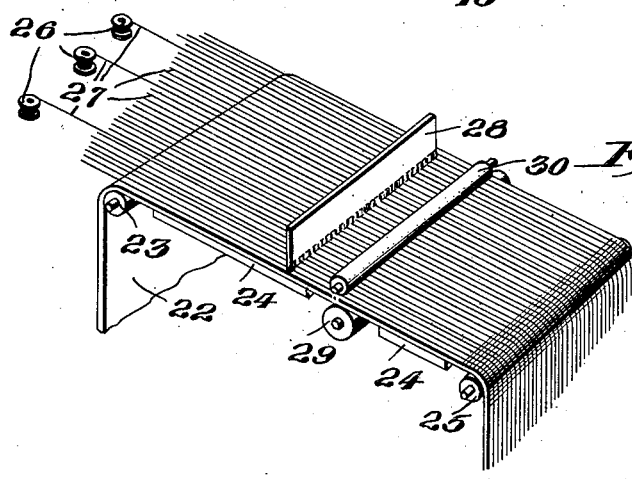
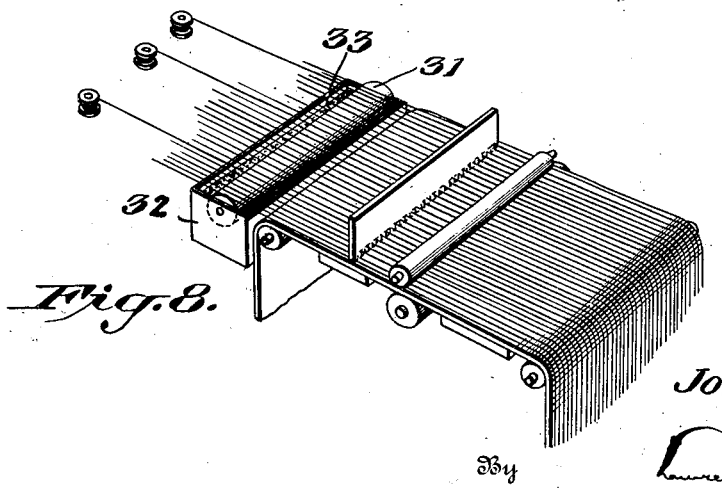

Patented May 12, 1925.

1,537,456

UNITED STATES PATENT OFFICE.

JOHN BROWN, OF AUCKLAND, NEW ZEALAND.

WEAR AND STRAIN RESISTING FABRIC.

Application filed September 10, 1920. Serial No. 409,293.

*To all whom it may concern:*

Be it known that I, JOHN BROWN, a subject of the King of Great Britain and Ireland, and resident of Auckland, New Zealand, have invented certain new and useful Improvements in and Relating to Wear and Strain Resisting Fabrics, of which the following is a specification.

This invention relates to improvements in and relating to laminated structures, and more particularly to the manufacture of an improved tread for pneumatic or other tires.

Heretofore, it has been proposed to construct tread members for tires in the form of a succession of crescent-shaped sections placed side by side and vulcanized to one another so that the convex surfaces of the crescents faced the wearing surface of the tire. It has also been proposed to manufacture these crescent-shaped sections of sheet rubber with rubberized fabric, but oftentimes the threads of the fabric were not properly impregnated with a vulcanizing solution before they were incorporated with the sheet rubber.

The present invention overcomes the defects of said proposals and in so doing has produced a practical and long wearing tread which will not separate under heavy loads, but which will have all the advantages of fabric-rubber treads.

The third defect of the proposed treads, namely that the fibers are not properly impregnated with rubberizing solution preparatory to the vulcanizing operation, I overcome by this invention by providing for the separate impregnation of each individual fiber before the threads are formed.

The tire tread of the present invention is particularly well adapted to be manufactured independently of the tire carcass so that as a separate article of manufacture it can be sold to tire manufacturers for their use in making finished tires. It is also well adapted for retreading purposes, especially on a carcass which has been built originally with the same tread.

Other features and advantages will hereinafter appear.

In the accompanying drawings:

Fig. 2 is a perspective view of a fragment of a tread member made according to the present invention.

Fig. 4 is a sectional view of a tire with a tread member constructed according to the present invention in which the strips constituting the tread are graduated so as to form a concaved inner surface conforming to the contour of the tire carcass.

Fig. 5 is a detail perspective view of a single strip showing the threads embedded in the side face thereof.

Fig. 6 is an elevation of a vat and movable rack used in the process of impregnating the threads with rubberizing solution.

Fig. 7 is a perspective view of an apparatus used for embedding the threads in the sheet rubber.

Fig. 8 is a perspective view of a similar apparatus, but in this apparatus the threads are coated with a rubberizing solution before they are embedded in the rubber sheet.

The tread 10 of the present invention may be furnished in long strips to be cut and applied to the tire carcass by the manufacturer of the tire or its may be made up of such length and shape so that each tread 10 as an entity may be applied to a tire carcass. The latter is the form I prefer at present, but of course my invention is of such scope as to include the former arrangement.

Figure 1:
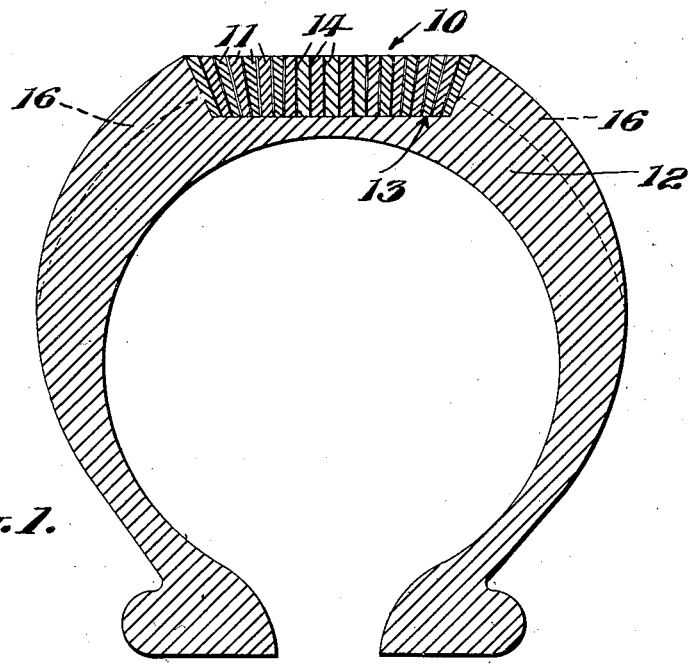
Figure 1 is a sectional view of a tire with the tread of the present invention as applied thereto.

As shown in the drawings, the tread 10 is made up of a plurality of juxtaposed strips 11, arranged in parallel relation and vulcanized together, and of such length as to extend around the periphery of the tire carcass 12, as shown in Fig. 4, or to be located in and extend from a circumferential groove 13 provided in the tire carcass 12, as shown in Fig. 1, in both cases the ends of the tread member meeting at some one place around the tire and being there vulcanized together.

Each strip 11 is formed of soft sheet rubber and has embedded therein, transversely thereof, threads 14 preferably of silk, as will be hereinafter described. The threads 14 are separate from each other (that is, they do not overlap and are not interwoven), and all extend in the same direction. They are so disposed in the sheet rubber as to extend substantially perpendicularly of the thread surface so that their ends will be presented to the road and will receive the wear thus reducing the wearing effect of the road on the rubber. Further, the threads being so arranged are conducive to good traction and are not liable to slipping and skidding as are all-rubber treads.

The tread 10 may in some cases have a base 15 of canvas, for instance as shown in Fig. 4, but this is not essential since the tread may be vulcanized directly to the carcass 12 of the tire if desired and as shown in Fig. 1.

The groove 13 in the carcass of the tire for the tread 10 shown in Fig. 1 is preferably made to converge and the tread when mounted therein is compressed slightly so that it will tend to maintain itself in position by friction in addition in the rubber of the carcass to which it is vulcanized, so that the rubber of the tread will be more condensed at the thinner part of carcass 12, and so that a greater wear surface will be presented to the road without weakening the carcass structure. In this form of tire construction a suitable filler 16 may be provided to make the external surface of the carcass extend close to the wear surface of the tread member 10. If desired, the tread member 10 may be beveled at 17, as shown in Fig. 3, and in this case the fillers 16 extend to the start of the bevels.

Figure 3:
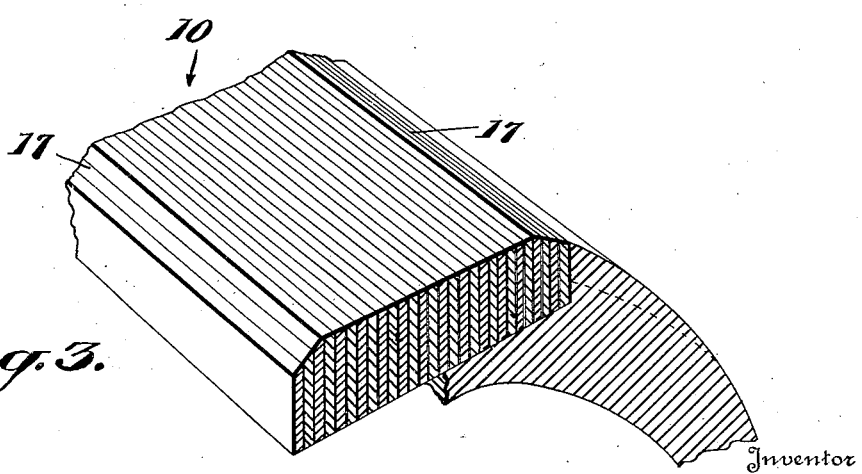
Fig. 3 is a view similar to Fig. 2 but showing a tread member having beveled edges.

In the forms of treads and tire constructions shown in Figs. 1, 2 and 3 the strips 11 are all substantially of the same height so as to have a flat wear surface and a flat surface for engagement with the carcass of the tire. If, however, it is desired to have the surface adjacent the tire carcass concave, as is the case when the tread is to be applied to the peripheral surface of the carcass, as shown in Fig. 4, the height of the strips are graduated, as at 17ª, so that the end strips are relatively short. In this case the fillers 16ª extend up to and contact with the entire side face of the end strips. It should be noted that the canvas 15 can be omitted in this form of tire and tread as well as in the forms shown in Figs. 1, 2 and 3.

The structure of the tread member 10 will be further referred to in connection with the following description of the process of impregnating the fibers of the threads and the process of embedding the threads in the sheet rubber.

The threads to be used are formed, preferably, of silk known as tussah silk or other silk having substantially the same characteristics. Of course, as has been said other materials may be used and some of these will be discussed hereinafter. The silk is removed from the cocoons in the usual way and is arranged in hanks for transportation and further use in the process.

The hanks of silk fibers are then washed in hot soapy water to remove the natural gum therefrom and to open the pores of the fibers preparatory of the impregnation step of the process. The washed fibres are then dried. The dried fibers are then hung in hanks on rods 18 (Fig. 6) to extend into a vat 19 containing a rubberizing solution 20. So that the silk fibers can be drawn through the solution during impregnation to insure that each fiber comes in contact with the solution, the rods 18 are mounted in a carriage 21 which is guided on the vat and which is movable manually or automatically by suitable means.

The rubberizing solution 20 is not the same as that of commerce, since the latter is too thick to penetrate the fine pores of the silk fibers. It is, however, made by diluting the rubberizing solution of commerce with a sufficient quantity of alcohol which will render the solution thin enough to filter through paper. I have found that if the solution can be filtered through paper it is thin enough to penetrate the pores of the silk.

The silk threads are taken, after they have been properly impregnated with the rubberizing solution, and dried and then formed into threads in the usual manner. The threads are then wound on spools to be used in the embedded process. Preferably, but not necessarily, the threads are each formed of approximately 100 fibers.

In Fig. 7 is shown a suitable apparatus for carrying out the next step of my invention, which is to embed the threads into the sheet rubber. As shown, the sheet 22, which is of soft unvulcanized rubber approximately $\frac{1}{16}$th of an inch thick, passes over a suitable roller 23, tables 24, and roller 25. The spools 26 of prepared thread are suitably mounted so that the threads 27 leading therefrom pass over the rubber sheet 22 and are arranged close together so that adjacent threads barely touch. For guiding the threads into this position a suitable comb 28 may be employed. An agate or other suitable plate having holes therein through which the threads pass may be used instead of the comb 28. The threads 27 and the rubber sheet 22, thus superposed, pass between a fixed roller 29 and a spring (not shown) pressed roller 30, so that the pressure between the rollers is sufficient to cause the threads 27 to be impressed and embedded in the sheet 22 which is comparatively soft and tacky. The adhesion of the threads with the rubber is further improved by the rubberizing solution which is contained in the fibers of the threads.

If preferably, under certain conditions, the threads 27 may be given a coating of rubberizing solution before they are embedded in the sheet 22. That is, they may be passed over rubberizing rollers 31, see Fig. 8, which rollers are mounted in, or at least are located, in a tank 32 containing rubberizing solution 33, which need not be as dilute as the rubberizing solution 20 used to impregnate the fibers in the beginning of the process. The roller 31 contacting with the solution 33 carries the same up to and deposits it upon the threads as they pass thereover. In this manner the threads will not only be constituted by fibers which were separately impregnated but will also comprise rubberizing solution between the separate fibers, thus being to a greater extent rubberized and in consequence will be more firmly united with the sheet rubber 22 when the vulcanizing operation is effected. Further, this coating will materially assist the threads in adhering to the rubber sheet 22 when they are embedded therein preparatory to the vulcanizing operation. If one roller 31 is not sufficient for the purpose additional rollers may be provided.

The sheet 22 is cut into desired lengths after the embedding operation is completed and piled to a suitable height for the cutting operation. Preferably, the sheet 22 has a width equal to the circumference of the tire to which the tread is to be applied, but in cases where narrower sheets are used several piles of sheets are placed side by side so as to make up the necessary width for the above stated purpose. The piles are then cut across the threads, the distance between cuts equaling the thickness of the tread. The cut strips are then turned up on ends and a suitable number of groups are arranged together preparatory to the vulcanizing operation, the threaded surface of one strip being in contact with the plain surface of the adjacent strip.

In order that the cutting operation will not delay the embedding operation, the sheets 22 may be piled upon a table as they are received from the embedding machine and when a suitable number of sheets have been received for the cutting operation to commence the table being movable is removed and an empty table moved into position to take its place.

The strips 11 are then placed in a suitable vulcanizing apparatus and vulvanized together, or, if the carcass and tread are to be simultaneously vulcanized, the tread strips 11 are assembled with the carcass and the entire assemblage placed in the vulcanizing apparatus.

If the tread is to be constructed as shown in Fig. 4 the strips which are of various heights are assembled in proper order before the vulcanizing operation is effected. If the tread is to be beveled as shown in Fig. 3, the bevel may be formed in any desired manner either before or after the vulcanizing operation.

In any case, it should be understood, the strips 11 are so arranged that the threads are perpendicular to the wear surface.

In order to render the entire tread, fibers and rubber, more waterproof, imperishable, and wear resisting, I incorporate in the raw rubber, in addition to ten per cent sulphur, ten to thirty per cent powdered asphaltum or bitumen. In addition to this, when cotton or flax or similar fibers are used for the threads, I dissolve bitumen or asphaltum in naptha, gasoline, or benzine and add twenty per cent of this solution to the rubberizing solution above described which is used to impregnate the fibers. Hanks of cotton or flax fibers can be impregnated with this rubber-bituminous solution in the same manner as the silk fibers are impregnated, as above described. If there is reason to believe that the fibers have been contaminated with grease, gum or size, or that the usual washing has not removed such foreign matter, it is then advisable to first treat the fibers with a pure bituminous solution, the effect of which will be to counteract such foreign matter and cause the rubber to adhere to the fibers. The hanks of fine cotton or flax fibers after they are impregnated are dried and straightened out in the usual way and then when further treated with the rubberizing solution are returned to the hank machine or winding machine to be formed into threads.

The cotton or flax threads may be coated just before they are embedded in the rubber sheet, and in this case the rubberizing solution used for coating preferably should contain from ten to thirty per cent of bituminous mixture. In this connection it may be well to note that the solution used for coating the silk threads, preferably, should also contain a bituminous mixture, but in this case only from ten to fifteen per cent is necessary.

Instead of impregnating the cotton and flax fibers separately with the rubberizing solution, they may be first made into very fine threads and the threads impregnated in the same manner as the fibers as above described. The separate threads can then be made into larger threads by twisting several fine threads together.

The threads which are embedded in the rubber sheet may be of any desired thickness and may be placed at any desired distance apart on the rubber sheet.

Variations may be resorted to within the scope of my invention and portions of the improvements used without others.

I claim as my invention:

As a new article of manufacture, a bitumen rubber and silk material comprising a strip of relatively thin bitumen rubber with silk threads embedded therein, each of the silk threads comprising silk fibers each of which is separately impregnated with a rubberizing solution.

In testimony whereof I affix my signature.

JOHN BROWN.